G. DUMONT.
TRANSMISSION GEARING FOR AUTOMOBILE VEHICLES.
APPLICATION FILED FEB. 15, 1909.

1,032,350.

Patented July 9, 1912.
4 SHEETS—SHEET 1.

WITNESSES

INVENTOR
Gustav Dumont
By Howson and Howson
Attorneys

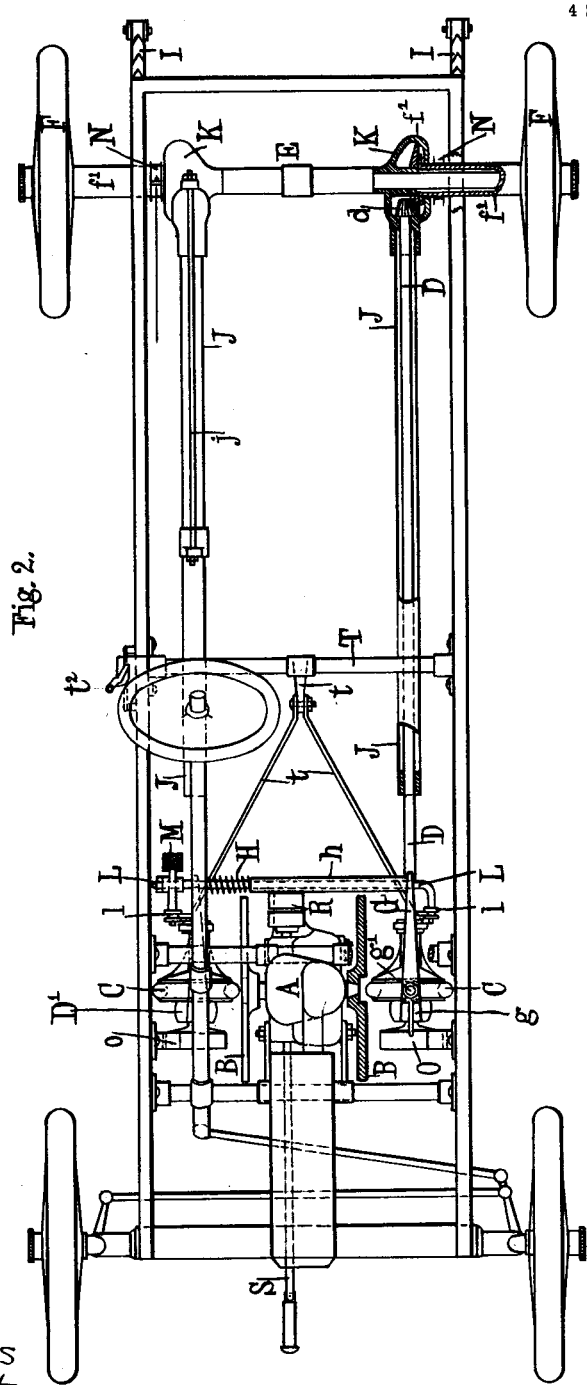

G. DUMONT.
TRANSMISSION GEARING FOR AUTOMOBILE VEHICLES.
APPLICATION FILED FEB. 15, 1909.
1,032,350.
Patented July 9, 1912.
4 SHEETS—SHEET 3.
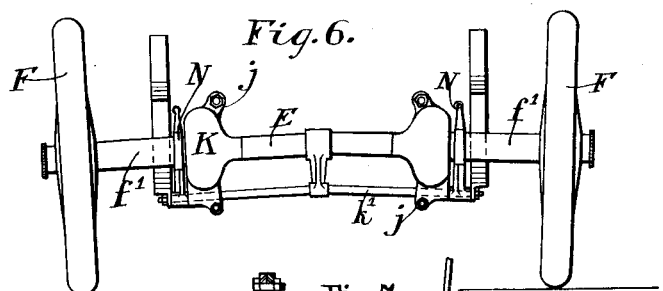
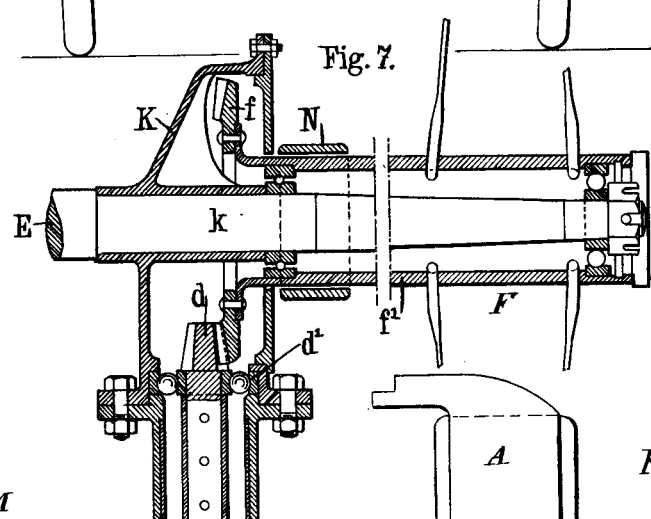
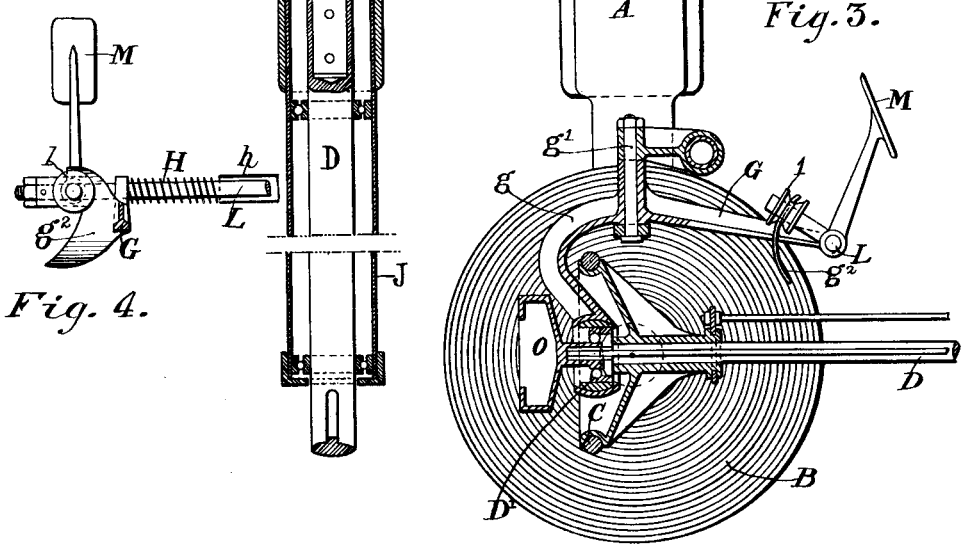
WITNESSES
L. H. Grote
M. E. Keir
INVENTOR
Gustav Dumont
By Howson and Howson
Attorneys G. DUMONT.
TRANSMISSION GEARING FOR AUTOMOBILE VEHICLES.
APPLICATION FILED FEB. 15, 1909.

1,032,350.

Patented July 9, 1912.
4 SHEETS—SHEET 4.

WITNESSES
L. H. Grote
M. E. Keir

INVENTOR
Gustave Dumont
By Howsmand Hinson
Attorneys

UNITED STATES PATENT OFFICE.

GUSTAVE DUMONT, OF NEUILLY-SUR-SEINE, FRANCE.

TRANSMISSION-GEARING FOR AUTOMOBILE VEHICLES.

1,032,350.  Specification of Letters Patent.  Patented July 9, 1912.

Application filed February 15, 1909. Serial No. 478,122.

*To all whom it may concern:*

Be it known that I, GUSTAVE DUMONT, a citizen of the French Republic, and residing at 16 Rue Louis Philippe, Neuilly-sur-Seine, France, have invented a certain new and useful Improvement in Transmission-Gearing for Automobile Vehicles, of which the following is a full, clear, and exact description.

This invention relates to transmission gearing for automobile vehicles and consists of an improved form of transmission gearing of the type known as friction drive, from the engine or motor to the driving road wheels.

The object of the invention is to provide a simple and inexpensive construction which will also better utilize a motor of low power and to allow of simple manipulation and control of the transmission gearing.

This transmission gear which comprises the known method of driving by plates or disks and friction rollers is designed with a view to effect the transmission of power from the engine to the two driving wheels of the vehicle by two separate shafts which are simultaneously but independently controlled, so that a differential or balance gear is unnecessary. The rear axle is made solid and of light weight and is readily shaped to give the wheels the preferred inclination. The two transmission shafts from the motor to the driving wheels can be laterally displaced simultaneously and thus disengaged from the motor; spring means for pressing the friction wheels into engagement with the driving plate afford the equivalent of the usual clutch while the customary mechanism is replaced by special operated means for separating the friction wheels from the driving plate and for braking.

The automobile road vehicle represented on the accompanying drawings is fitted with the present invention.

Figure 1:
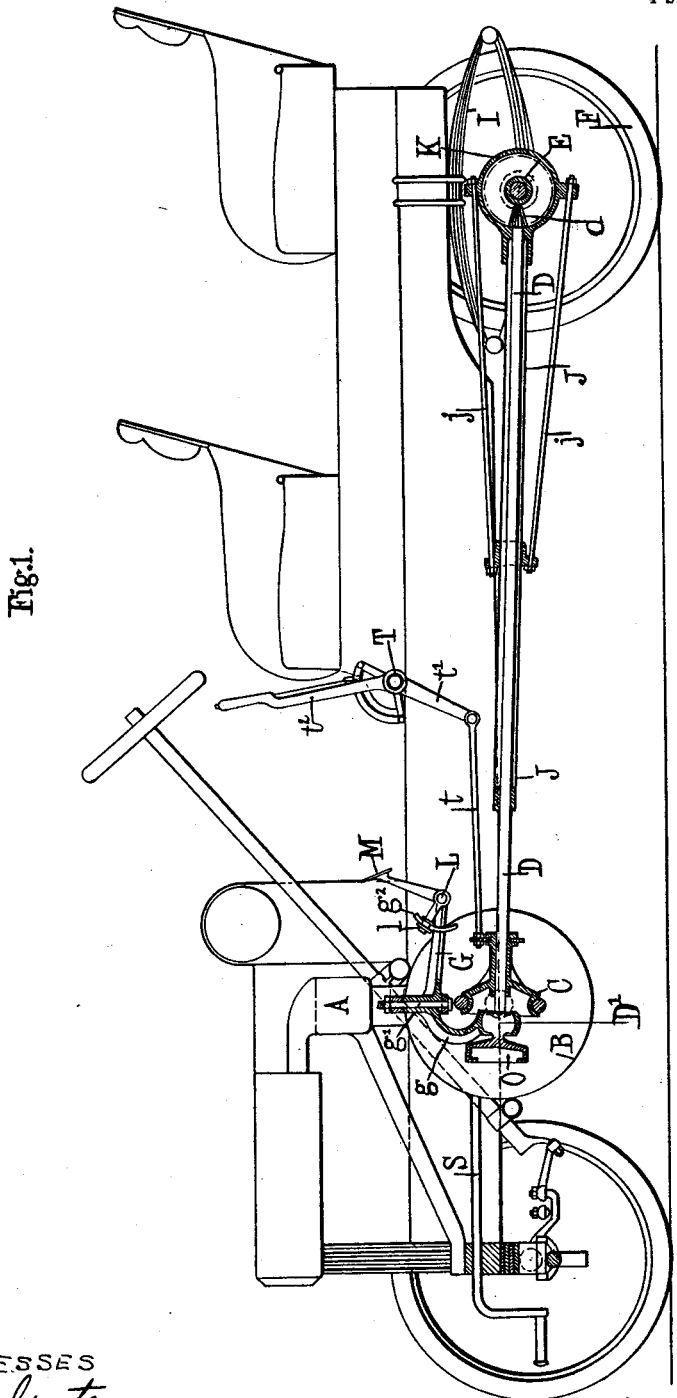
Figure 5:
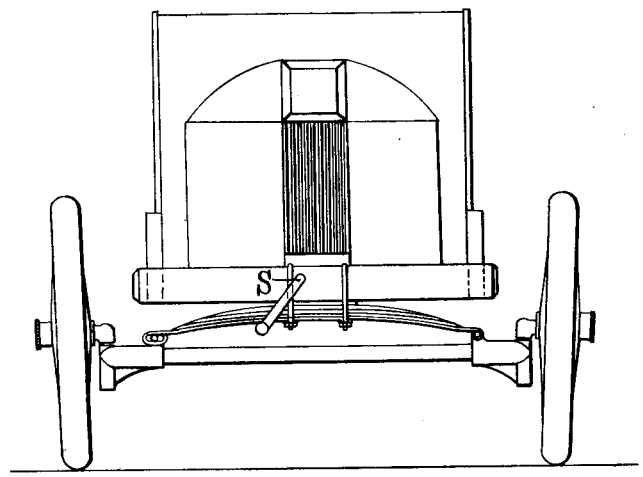
Figure 8:
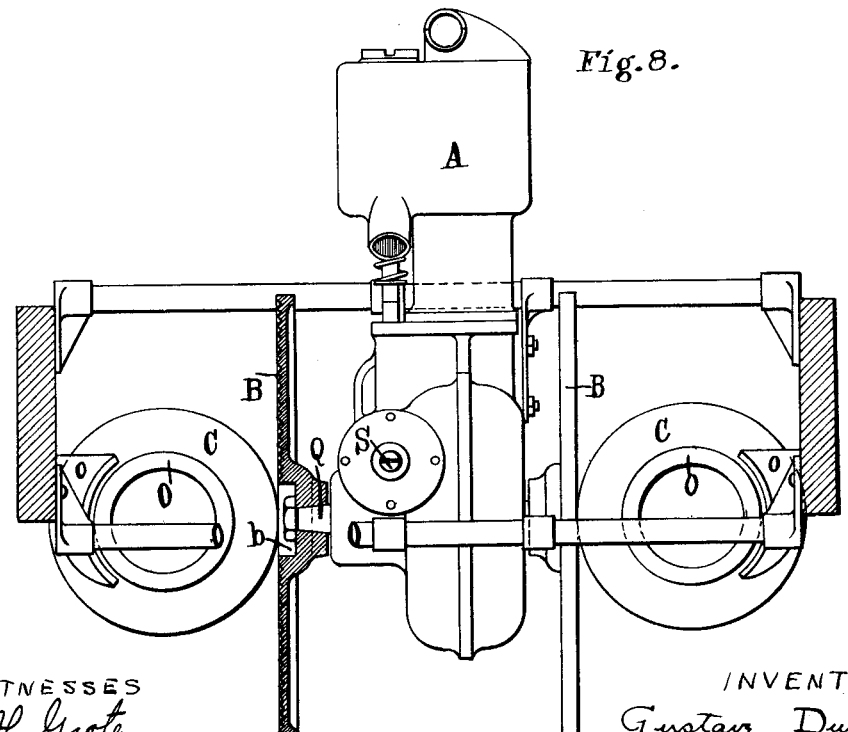

Figure 1 is a view of the whole in longitudinal, sectional elevation; Fig. 2 is a plan view, in horizontal section; Fig. 3 shows on a larger scale, partly in elevation and partly in section, one of the flywheel disks of the engine and the corresponding forward part of the transmission shaft and its friction roller; in this figure the roller is shown in the position for reverse drive; Fig. 4 is a view at right angles to Fig. 3, showing a detail of the clutch control; Fig. 5 shows the vehicle seen from the front. Fig. 6 shows the rear axle or bridge; Fig. 7 illustrates in section and on a larger scale the mounting and driving connection of one of the driving wheels; and Fig. 8 shows on a larger scale the motor seen from the front.

The motor of this automobile road vehicle is indicated at A arranged in front as usual and is mounted in such a way that its crankshaft is perpendicular to or transverse of the longer axis of the vehicle; the motor is furnished with two fly-wheels B, B which constitute the two driving plates or disks. This motor may be of any suitable make which enables it to be mounted in this particular manner and the invention is not limited to any particular type of engine. The driving disks B, B may be shaped in any suitable manner with a view to their function and are preferably formed with a central cut-away portion $b$ affording a declutched or disengaged position for the friction rollers which are driven by these plates, and they may be of metal or other suitable material.

Two friction rollers C furnished with leather, fiber or other suitable surfaces are arranged to bear against the plates B, and are movable across the face thereof being preferably mounted by means of long keys on the two shafts D, D which extend longitudinally to the rear axle E and drive respectively the two rear wheels F, F by bevel pinions. The two friction rollers C are capable of being simultaneously displaced longitudinally on their shafts D to any point on a diameter of the driving plates B for the purpose of varying the speed of the drive. It is sufficient practically however, if they can be displaced along the entire radius in the direction to secure the forward drive and to the extent of only a small portion of the radius in the opposite direction to secure the reverse drive. The movement of these friction rollers is effected by means of rods $t$ connected to a lever $t^1$ fast with a shaft T to which is fixed a controlling lever $t^2$ guided by a quadrant. A friction drive of this character being suitable only for fairly low-power machines and inasmuch as each of the two transmission shafts D, D transmits only half of the power, these shafts may be of relatively small cross section, consequently by reason of the relatively great distance between their points of support adjacent to the engine in front and at the rear axle behind, they possess a certain amount of flexibility which may be utilized for the separation or the engagement of their friction rollers C from or with the driving plates B, and the necessity for employing the common universal joints in the transmission shafts is thus avoided. This feature of my invention results in a very much simplified transverse structure. Further, these shafts can be utilized as thrust bars and torque rods between the rear axle and the chassis, thus insuring the symmetrical transmission of the thrust to the latter on one side and the other of the longer axis of the vehicle. This aids in maintaining the proper position of the rear axle.

The two shafts D are supported near the engine in two bearings $D^1$ which serve also as abutments. In the form shown the bearings have the form of a ball and socket joint, the sockets being carried by the arms $g$ of the double levers $g$, G, $g$, G which are pivoted on vertical pins $g^1$. The flexibility of the shafts D permits their rollers C to be sprung away from the plates B against which they are normally pressed by a spring H which constitutes the clutch spring. The declutching or disengaging of the friction rollers from the driving plates is effected through a pedal mechanism explained hereinafter. Each of the two shafts D carries at its rear end a bevel pinion $d$ which engages and drives a bevel gear wheel $f$ fast with the corresponding driving road wheel F. The axle proper E is a single light shaft which extends from one wheel to the other and by which the ordinary suspension springs I are carried. Each of the wheels F is mounted upon a sleeve $f^1$ which constitutes its hub, and this latter is fitted with the bevel wheel $f$ which is journaled upon the fixed shaft E. It will be remarked that this construction of the axle on the rear bridge permits the usual tilting of the wheels without a special arrangement and that it insures perfect solidity of the axle which cannot be obtained by live axle arrangements having a differential gear, except by means of constructional complications which are a disadvantage as well as of increasing weight.

The two shafts D, D are extended into and through two tubes or sheaths J in which they are guided by suitable bearings; these two tubes J are made fast with two casings K inclosing the pairs of bevel gears $d, f$, and mounted at $k$ upon the shaft of the axle E so as to be capable of pivoting to the small extent which is necessitated by the vertical displacements of the axle resulting from the travel of the vehicle; these two casings are connected by a bar $k^1$. The thrust is transmitted from the axle to the chassis or frame of the vehicle by the two shafts D, D equally; the thrust in each case being transmitted from the hub of the wheel to the shaft D by the ball-bearing $d^1$, situated near the pinion $d$, and from the shaft to the chassis by the ball and socket bearing $D^1$ (which is also a ball bearing) and by the lever $g$ G and the axis support $g^1$ which is secured to the engine and the chassis. This transmission of the thrust by the two symmetrical shafts D, D, affords the great advantage of preserving to the rear bridge its correct vertical position with relation to the chassis and the special thrust bars which for a well-designed construction would have to be two in number on each side of the axle, may be dispensed with. Rods $j$ arranged in a vertical plane connect the sheaths J at a suitable point in their length to their respective casings K.

It has been seen above that the flexibility of the shafts D has been utilized; that use extends to the whole of these shafts and their sheaths J.

The two driving road wheels being independent adapt themselves readily to differences of path of travel such as occur at turnings or corners, since the friction drive readily permits a slight slip of the friction rollers upon the driving plates. The effect of a differential gear is thus obtained without its inconveniences.

The levers $g$ G are controlled so as to obtain the necessary pressure of the rollers against the plates, or to remove said pressure, by means of the following arrangement. These double levers $g$ G are mounted on a shaft L and the spring H tends normally to separate these arms G, thus serving to press the rollers C against the plates B. In order that the spring H shall not be of excessive length, a sleeve $h$ is interposed between one end of the spring and one of the arms G. To separate the friction rollers from the driven plates and thus obtain a declutching action, a pedal M is provided fast to the shaft L, this shaft having two rollers $l$ which are in contact with two cams $g^2$ fast with the arms G. When the pedal M is in its normal position the spring H presses the rollers into frictional contact with the driving plates, but when the pedal is depressed, the rollers are separated, overcoming the action of the spring, by reason of the flexibility of the shafts D as above explained.

The braking device is of any desired character, but preferably arranged in connection with braking drums O on the shafts D which are pressed against the braking blocks $o$ by continuing the downward pressure upon the pedal M. This affords the advantage of braking of the two wheels by means of a pedal but without the well known inconveniences which attend the usual method of foot-braking the differential which results in a disturbance of this device when the two wheels have not the same adherence on the road surface. It will be noticed, therefore, that the result of this duplicated friction-drive, in addition to dispensing with the differential, is the important advantage of a regular and equal propulsion by the two driving road wheels and of a powerful and equal braking action, so that the invention allows of a construction which while being stronger than that of an ordinary live axle with a differential, permits the inclination of the wheels without difficulty and is nevertheless of very light weight. These different characteristics with the simplicity of the construction which results therefrom, enable an automobile vehicle to be constructed which is certain and regular in its working, of a good appearance on the road and of low cost.

I do not limit myself to the precise form of construction shown, which may be varied in many ways without departing from my invention, but claim as my invention:

1. In a friction driving mechanism for automobiles and the like, a transmission shaft of such texture and dimensions that it may be slightly flexed, a friction rotor carried thereby, a driving rotor against which said friction rotor normally bears and means for springing said transmission shaft to separate said friction and driving rotors, substantially as described.

2. In a friction driving mechanism for automobiles and the like, a rigid transmission shaft of such texture and length as to permit of slight flexure, supports therefor spaced apart a sufficient distance to permit the necessary flexure of said shaft, a friction rotor carried by said shaft, a driving rotor against which said friction rotor normally bears and means for springing said transmission shaft to separate said friction and driving rotors, substantially as described.

3. In a friction driving mechanism for automobiles and the like, an integral driving shaft of such texture and length as to permit of slight flexure, a friction rotor carried thereby, a driving rotor against which said friction rotor normally bears and means for springing said transmission shaft to separate said friction and driving rotors, substantially as described.

4. In a friction driving mechanism for automobiles and the like, a transmission shaft of such texture and dimensions that it may be slightly flexed, a friction rotor carried thereby, a driving rotor against which said friction rotor normally bears and means for springing said transmission shaft to separate said friction and driving rotors, in combination with means for shifting the point of engagement between said friction and driving rotors to secure change of speed or reverse of direction, substantially as described.

5. In a friction driving mechanism for automobiles and the like, a transmission shaft of such texture and dimensions that it may be slightly flexed, a friction rotor carried thereby, a driving rotor against which said friction rotor normally bears and means for springing said transmission shaft to separate said friction and driving rotors, in combination with a bevel pinion on the end of said transmission shaft and a driven wheel having a sleeve, a bevel gear thereon with which said bevel pinion is held constantly in mesh in predetermined relation.

6. In a friction driving mechanism for automobiles and the like, a rectangular supporting frame, a driving rotor arranged adjacent one end of the frame, a driven member arranged adjacent the opposite end of the frame, and a transmission shaft extending lengthwise of the frame between said driving and driven members, said shaft being of such length and texture as to permit of slight flexure, in combination with a friction rotor carried by said shaft and normally bearing against the driving rotor and means for flexing said transmission shaft to separate said friction and driving rotors, substantially as described.

In testimony whereof I have signed my name to this specification, in the presence of two subscribing witnesses.

GUSTAVE DUMONT.

Witnesses:
 LÉON FRANCKEN,
 CHARLES DONN.